2,962,508

TETRAMETHYLOLTETRAHYDROPYRAN AND PROCESS OF PREPARATION

Thomas J. Prosser, Wilmington, Del., assignor to Hercules Powder Company, Wilmington, Del., a corporation of Delaware No Drawing. Filed Dec. 21, 1959, Ser. No. 860,669

2 Claims. (Cl. 260—345.9)

The present invention relates to the new and useful compound tetrahydro - 3,3,5,5 - tetrakis(hydroxymethyl)pyran and to a method for its preparation.

In accordance with this invention, I have found that by condensing formaldehyde and glutaraldehyde in aqueous medium in the molar proportion of 6:1 at a temperature of 20°–100° C. in the presence of a basic compound of an alkali metal or alkaline earth metal at a pH of 9 to 13 and continuing the condensation until at least about 80% of the theoretical amount of basic compound (two moles per mole of glutaraldehyde) has been consumed, there can be isolated from the reaction product in relatively high yield a new and useful crystalline polyhydric alcohol which has been identified as tetrahydro-3,3,5,5-tetrakis(hydroxymethyl)pyran.

The formation of tetrahydro-3,3,5,5-tetrakis(hydroxymethyl)pyran depends upon achieving substantial consumption of the basic compound via Cannizzaro reaction. This requires maintaining the reaction for a sufficiently long time at a given temperautre in the range of about 20° to 100° C. to effect the Cannizzaro reaction. The time required varies inversely with temperature, being quite long at low temperatures and being relatively short at high temperatures.

While prior investigators have reacted glutaraldehyde and formaldehyde in the presence of a basic compound to produce syrupy products of varying hydroxyl content, these investigators carried out the reaction until only a relatively small fraction of the theoretical amount of base was consumed and have not reported nor detected the above polyhydric alcohol in their products.

The invention is illustrated in the following examples. Parts and percentages are by weight unless otherwise specified.

*Example 1*

Into a reaction vessel provided with a mechanical stirrer, reflux condenser, dropping funnels, and means for recording pH and the temperature, there was placed 495 parts of 40% formaldehyde solution and 195 parts of water. Thereafter, the pH of the mixture was adjusted to 11.0 by the addition of 52 parts of 50% aqueous NaOH. While holding the temperature of the reaction mixture in the range of 25° to 36° C. by circulating cooling water through the jacket of the reactor, there was added over a period of one hour at a uniform rate 400 parts of a 25% aqueous solution of glutaraldehyde while simultaneously 50% aqueous NaOH was added to maintain the pH at 11. After the addition of glutaraldehyde was completed, the reaction temperature was increased to 50° C. and held there for 10 hours, then heated to 60° C. and held for two hours and finally heated to 70° C. and held six more hours. During the entire period 108% of the theoretrical quantity of NaOH was consumed.

The reaction mixture was a mobile liquid which at this point had begun to caramelize. It was then passed through an ion exchange column containing both a strongly acidic cation exchange resin and a strongly basic anion exchange resin to remove sodium formate. The effluent from this column was collected in approximately 25 equal fractions. Each fraction was stripped of water on a steam bath in vacuo and then taken to complete dryness in a 50° C. vacuum oven. From the first nine fractions of deionized effluent there was recovered 127 parts of a white crystalline solid. From the last 16 fractions was recoverd an oily by-product in the amount of 31.4 parts.

After recrystallization from water, the crystalline product was found to have a melting point of 176.5° C., was soluble in ethanol and water, and was insoluble in acetone, ether, chloroform, and dioxane. It was analyzed and the results compared with the calculated values for tetrahydro - 3,3,5,5 - tetrakis(hydroxymethyl)pyran. The data are as follows:

|  | Found | Calculated |
|---|---|---|
| Hydroxyl content (Percent) | 31.9, 32.3 | 32.99 |
| Carbon (Percent) | 52.64, 52.51 | 52.41 |
| Hydrogen (Percent) | 8.80, 8.96 | 8.80 |
| Molecular Weight (Determined in Ethanol) | 206, 206 | 206.23 |

Further identification of the crystalline product was made via infrared spectrum which showed strong hydroxyl absorption and, in addition to numerous others, bands at 9.05, 9.25 and 9.5–9.8$\mu$. The 9–10$\mu$ absorption is characteristic of the C—O linkage and would be expected for both methylol groups and ether bonds. Tetrahydropyran exhibits infrared absorption at 9.12, 9.53, 9.69 and 9.90$\mu$ assigned to the C—O—C group. The broad band of 9.5 to 9.8$\mu$ in the crystalline product is characteristic of the methylol group as indicated by the presence of this same band in the spectra of pentaerythritol and polypentaerythritols. Thus the infrared data lend support to the assigned structure.

*Example 2*

The procedure of Example 1 was followed with these exceptions: the amount of aqueous formaldehyde was increased to 600 parts to provide a formaldehyde to glutaraldehyde molar ratio of 8:1 instead of 6.6:1 as in the first example, the temperature range during the addition of glutaraldehyde was 25° to 65° C., and after glutaraldehyde addition, the reaction cycle was five hours at 70° C. The amount of NaOH consumed was 100% of the theoretical amount. The reaction product was divided into two equal portions. One portion was deionized as in Example 1 to give 71.3 parts of a crystalline product identified as tetrahydro-3,3,5,5-tetrakis(hydroxymethyl)pyran, representing a yield of 69.2%.

The other portion of the reaction product was treated with 25 parts of activated charcoal, filtered to remove the charcoal, and then concentrated to 450 parts by boiling. The resulting dark brown syrup was again treated with 10 parts of activated charcoal, filtered, and the filtrate allowed to stand at room temperature until crystallization of a white solid was noticeable. The crystalline material was filtered off and the filtrate further concentrated to 300 parts in vacuum. After standing a second time, further crystallization took place and a second crop of crystals was separated by filtration. The two crops of crystals amounted to 48.2 parts and were identifiⓔd as a mixture of tetrahydro-3,3,5,5-tetrakis(hydroxymethyl)pyran and sodium formate.

In elaboration of the preceding examples, the preparation of tetrahydro-3,3,5,5-tetrakis(hydroxymethyl)pyran involves the condensation of formaldehyde and glutaraldehyde in aqueous medium in the presence of a basic compound of an alkali metal or an alkaline earth metal at a pH of 9 to 13 and at a temperature of 20° to 100° C. until at least about 80% of the theoretical quantity (2 moles per mole of glutaraldehyde) of the basic compound has been consumed. This gives a syrupy product containing a high percentage of tetrahydro-3,3,5,5-tetrakis(hydroxymethyl)pyran from which the new polyl can be recovered by any of several procedures.

The simplest recovery procedure is to concentrate the reaction product by removal of water but this produces a mixture of sodium formate and polyol which is difficult to separate into its components. A recovery procedure that gives a much purer product comprises de-ionizing the crude reaction product by contacting it with both a cation exchange resin and an anion exchange resin to remove sodium formate. As seen from the examples the effluent from such deionization contains the desired compound in crystalline form.

One of the most important variables affecting the speed of reaction is temperature. Within the specified range of approximately 20° to 100° C. the reaction proceeds very slowly at the lower end of the range, requiring a matter of weeks at 20° C., but quite rapidly in the upper part of the range, requiring only a few hours at 60° to 100° C. Results approaching the optimum are obtained by carrying out the condensation for about 2 to 5 hours at 70° C. since higher temperatures cause some decomposition of the product. During the addition of glutaraldehyde, however, it is desirable to keep the temperature below about 40° C. since this precaution seems to give a slightly better yield of tetrahydro-3,3,5,5-tetrakis(hydroxymethyl)pyran.

Another variable, which has a marked effect on yield, is the extent of reaction as measured by the consumption of base. Theoretically, the Cannizzaro reaction between glutaraldehyde and basic compound can consume two moles of base per mole of aldehyde. In order to achieve a reasonable yield of tetrahydro-3,3,5,5-tetrakis(hydroxymethyl)pyran it is necessary to continue the reaction until at least 80% of the theoretical amount has been consumed. The effect of shorter reaction periods is seen from the fact that if only 60% of the theoretical amount of base is consumed, considerably less than 10% yield can be expected. If the consumption of base is much less than 60%, then tetrahydro-3,3,5,5-tetrakis(hydroxymethyl)pyran is not isolatable from the product nor detectable therein.

In the preparation of the new polyol, formaldehyde and glutaraldehyde combine in the molar proportion of 6:1. It is desirable, however, to employ a slight excess of formaldehyde to drive the equilibrium in the desired direction.

The pH of the reaction can be maintained between 9 and 13 by the addition of the basic compound as necessary. Any of the basic compounds commonly used in aldol condensation can be employed. Foremost among these are hydroxides of sodium and potassium and oxides and hydroxides of calcium, barium, etc.

The compound of the invention has proved to be useful as an intermediate for the manufacture of esters that have excellent plasticizing ability for poly(vinyl chloride). This is illustrated by the preparation of an ester by the complete esterification of tetrahydro-3,3,5,5-tetrakis(hydroxymethyl)pyran with a mixture of caproic, caprylic, and capric acids having an average chain length of 7.3 carbon atoms. This ester when milled with poly (vinyl chloride) in the amount of 50 parts per 100 parts of the polymer gave a plasticized composition showing excellent resistance to migration of the plasticizer, a low brittleness temperature and efficient plasticization.

What I claim and desire to protect by Letters Patent is:

1. Tetrahydro - 3,3,5,5 - tetrakis(hydroxymethyl)pyran.

2. The process of preparing tetrahydro-3,3,5,5-tetrakis(hydroxymethyl)pyran which comprises condensing formaldehyde and glutaraldehyde in aqueous medium at a temperature of 20° to 100° C., in molar proportion of 6:1 in the presence of a basic compound of a metal selected from the group consisting of alkali metals and alkaline earth metals at a pH of 9 to 13 and continuing the condensation until at least about 80% of the theoretical amount of basic compound required for Cannizzaro reaction has been consumed.

No references cited.